United States Patent
Gettinger

[15] 3,671,032
[45] June 20, 1972

[54] ADJUSTABLE HOLDING DEVICE

[72] Inventor: John F. Gettinger, 1500 N.W. First Avenue, Fort Lauderdale, Fla. 33311

[22] Filed: June 22, 1970

[21] Appl. No.: 48,093

Related U.S. Application Data

[63] Continuation-in-part of Ser. No. 837,380, June 30, 1969, Pat. No. 3,595,559.

[52] U.S. Cl....................................269/72, 269/77, 269/131
[51] Int. Cl............................................................B23q 1/04
[58] Field of Search....................................269/71–80, 130, 269/131, 132; 248/184

[56] References Cited

UNITED STATES PATENTS

| | | | |
|---|---|---|---|
| 2,803,872 | 8/1957 | Massa | 269/76 X |
| 2,879,059 | 3/1959 | Sandefur | 269/76 X |
| 3,205,522 | 9/1965 | Then | 248/184 X |
| 3,595,559 | 7/1971 | Gettinger | 269/77 |

Primary Examiner—Theron E. Condon
Assistant Examiner—Neil Abrams
Attorney—Settle and Oltman

[57] ABSTRACT

An adjustable holding device for holding automobile bumpers or the like while work is being performed on them. The device includes a support base having a vertical component defining a cradle, and a rotatable cylinder horizontally mounted on the cradle for adjustable swinging movement. At least two engaging elements for engagement with the edges of a bumper are mounted in parallel on the rotatable cylinder. Also included is a holding mechanism mounted on the engaging elements which is used for holding a bumper in position when it is engaged with the engaging elements, and a brake mechanism for holding the rotatable cylinder on the cradle in any adjusted position.

5 Claims, 10 Drawing Figures

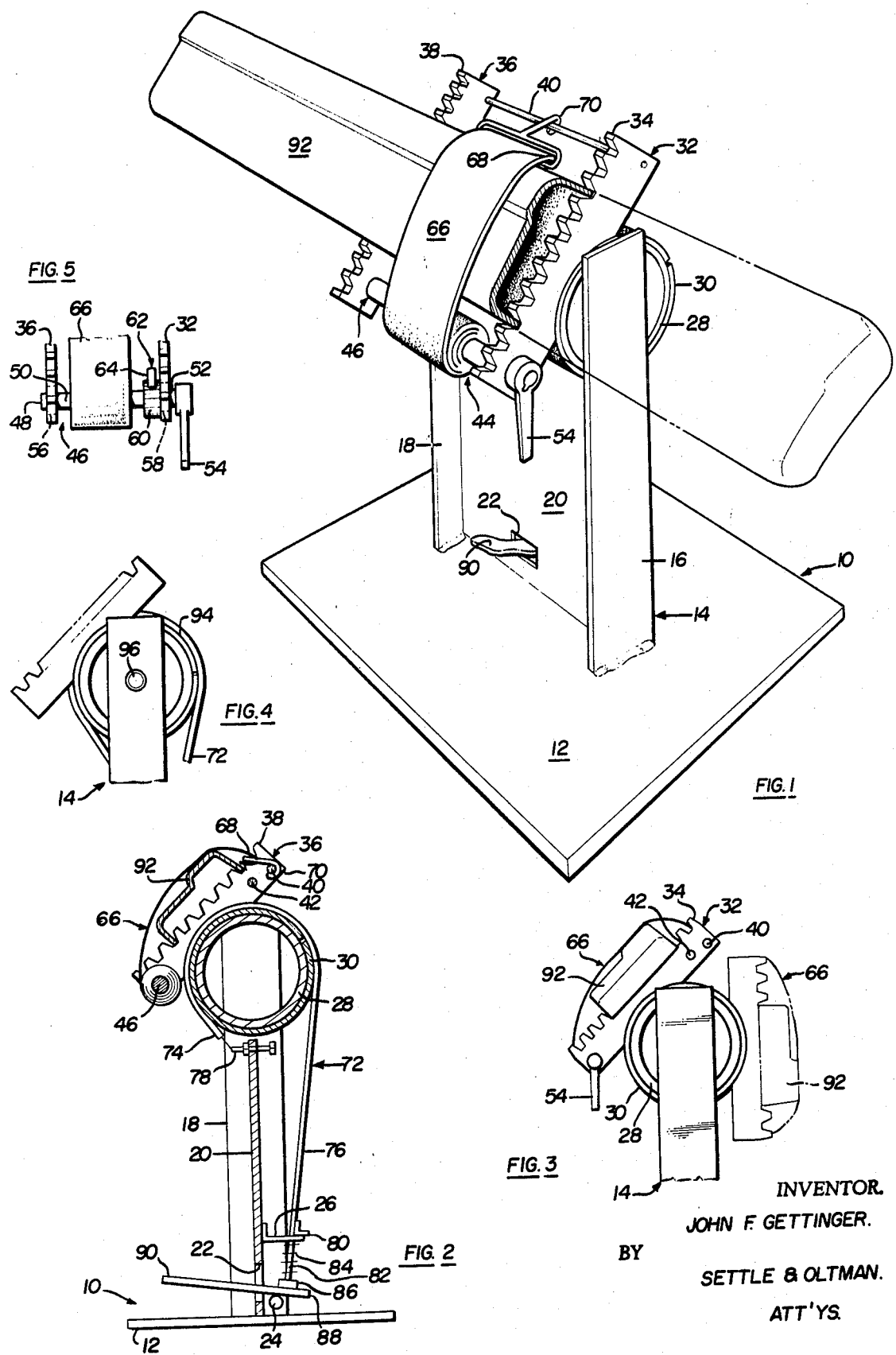

INVENTOR.
JOHN F. GETTINGER.
BY
SETTLE & OLTMAN.
ATT'YS.

ADJUSTABLE HOLDING DEVICE

REFERENCE TO RELATED APPLICATION

This is a Continuation-In-Part of co-pending application Ser. No. 837,380 filed June 30, 1969 now U.S. Pat. No. 3,595,559 in the name of John F. Gettinger for "Adjustable Holding Device."

BACKGROUND OF THE INVENTION

1. Field of the Invention

This invention relates to an adjustable holding device for automobile bumpers and the like. Automobile bumpers are rather expensive items to replace when damaged. If at all possible, damaged bumpers are repaired rather than replaced. Damaged automobile bumpers are also salvaged from wrecked automobiles for repair and resale in the replacement market.

2. The Prior Art

When an automobile bumper is repaired it is conventionally put into a vise to hold it steady while dents are pounded out, or it is ground or welded.

It is often necessary to reposition the bumper in the vise to achieve the best working angle. This requires that the bumper be put in and out of the vise several times during the course of the repair. This is time consuming and uneconomical. In addition it puts a physical strain on the repairman. Moreover, it is not always possible to position the bumper in the vise in the precise desired angle.

It is an object of this invention to provide a device for holding automobile bumpers or similar pieces in which the work position of the bumper can be universally adjusted without removing the bumper for the apparatus.

It is a further object of this invention to provide a device for holding automobile bumpers or similar pieces in which the work position of the bumper can be adjusted front to rear through an angle of about 180° and angled sideways left and right, and the position holding and release means is foot operated, leaving the hands free for other uses.

Other objects of this invention will appear in the following description and appended claims, reference being had to the accompanying drawings forming a part of this specification wherein like reference characters designate corresponding parts in the several views.

IN THE DRAWINGS

FIG. 1 is a perspective view of the device of the invention;

FIG. 2 is a cross-sectional view of the device of the invention;

FIG. 3 is an elevational view of the upper part of the device of the invention;

FIG. 4 is a side elevational view of the upper part of an alternate embodiment of the device of the invention;

FIG. 5 is a top view of the rotary shaft and ratchet mechanism of the device of the invention;

PREFERRED EMBODIMENTS OF THE INVENTION

Figure 7:
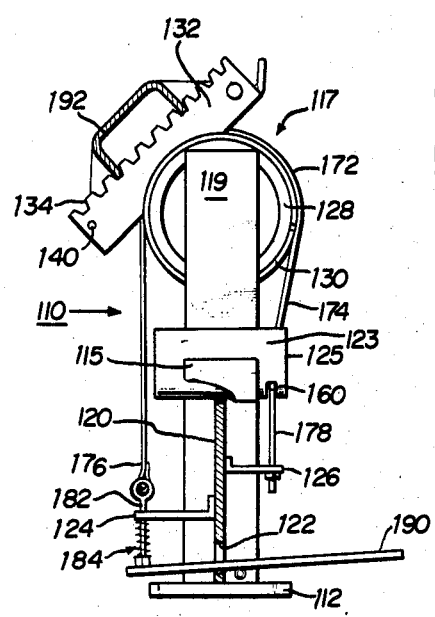
FIG. 7 is a side view of the device of the invention shown in FIG. 6.
Figure 10:
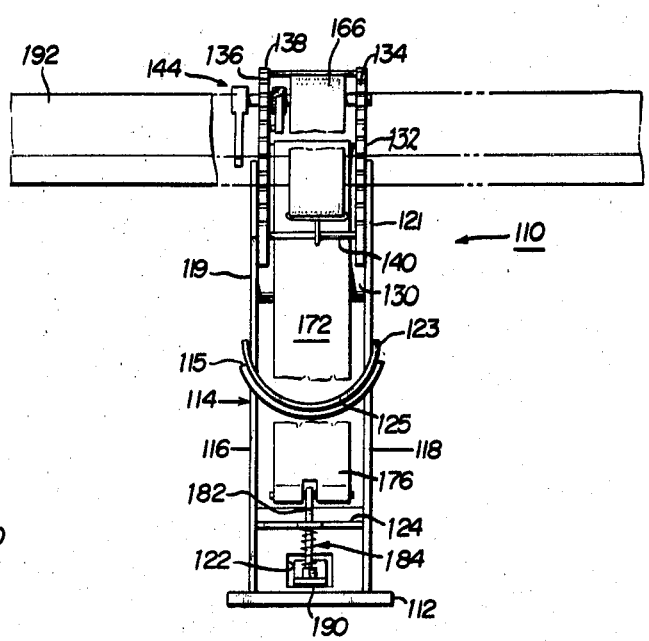
FIG. 10 is a front view of the device of FIG. 6 of the invention.

The adjustable holding device 10 of this invention comprises a rectangular base 12 upon which is welded a vertically positioned I-beam consisting of two parallel rails 16 and 18 connected by a web 20 which extends approximately ⅔ of the way up from the base 12 between the rails 16 and 18. The web 20 has a slot 22 in it at the bottom thereof. A bar 24 is horizontally positioned across the slot 22 and fastened to the web 20 on each side of the slot 22. A retaining plate 26 having an orifice (not shown) in it is horizontally mounted between the rails 16 and 18 near the lower end of the I-beam 14 and projects slightly outward therefrom.

A cylindrical hub 28 is horizontally mounted in the top part of the I-beam 14, between the rails 16 and 18.

A rotatable split or continuous cylinder 30 is concentrically positioned around the hub 28, a split cylinder being shown.

A rectangular holding plate 32 having a notched upper surface 34 is welded to one edge of the cylinder 30 and another rectangular holding plate 36 having a notched upper surface 38 is welded to the opposite edge of the cylinder, in parallel relation to the holding plate 32.

Two catch bars 40 and 42 are mounted between the holding plates 32 and 36 at one of the ends of the plates. A rotary shaft and ratchet mechanism 44 is mounted between the opposite ends of the plates.

The rotary shaft and ratchet mechanism comprises a rotatable shaft 46 having a first end section 48, an enlarged diameter section 50, and a second end section 52 adapted to receive a socket wrench 54. The shaft is supported at the first end section 48 by a bushing 56 contained in the end of the holding plate 36 and is supported at the second end section 52 by a bushing 58 contained in the end of the holding plate 32. The second end section 52 of the shaft 46 extends beyond the bushing. A ratchet wheel 60 is permanently mounted on the shaft 46, adjacent the enlarged diameter section 50 on the side supported by the bushing 58.

A pawl 62 having a handle 64 attached thereto is pivotally mounted on the inside of the holding plate 32 and is engageable with the ratchet wheel 60. The handle 64 enables the pawl 62 to be engaged or disengaged with the ratchet wheel 60 as desired.

A belt 66 having a free end 68 with a catch 70 attached to it is fastened to and rolled around the enlarged diameter section 50 of the shaft 46.

A flexible metal brake band 72 having a fixed end 74 and a free end 76 is lapped over the split cylinder 30. The fixed end 74 is fastened to the web 20 of the I-beam 14 on the side opposite from the retaining plate 26 with an adjustable bolt 78. An outwardly extending stop 80 is fixed to the free end 76.

A bolt 82 is attached to the top of the free end 76 of the band 72 and extends through the orifice in the retaining plate 26. A spring 84 is positioned around that portion of the bolt 82 extending below the plate 26 and is biased against the underside of the plate 26 and against a washer 86 around the end of the bolt 82 which is held in place by a nut 88.

A foot pedal 90 using the rod 24 as a fulcrum, extends through the slot 22 in the web 20. One end of the foot pedal 90 is positioned underneath the belt 82 and is in contact therewith; the other end is free. The foot pedal may be extended as by means of bars (not shown) so that it can be depressed from either side of the device.

In at rest position, the expansion action of the spring 84 draws the band 72 tightly around the split cylinder 30 maintaining the cylinder 30 in the position it then occupies.

When the free end of the foot pedal 90 is depressed, the spring 82 is compressed, relieving tension on the band 72. The cylinder 30 is then free to be moved to another position.

To operate the apparatus of the invention, a desired position for the cylinder 30 is selected. The foot pedal 90 is then actuated, releasing the tension on the band 72, and the cylinder 30 is positioned in the selected position. Then the foot pedal 90 is released, allowing the spring 82 to expand, placing the band 72 under tension and locking the cylinder 30 into place.

Then a bumper 92 is placed on top of the notched plates 32 and 36 with at least one edge of the bumper digging into the notches on the top surfaces 34 and 38 of the plates. The belt is then drawn over the bumper 92 and the catch 70 is hooked onto one of the bars 40 or 42. The belt 66 is then tightened by rotating the shaft 46 with a wrench. The belt 66 is maintained in the tightened position with the ratchet wheel 60 and pawl 62 interacting. The tight belt 66 holds the bumper 92 firmly on the notched plates 32 and 36.

In an alternative embodiment (as shown in FIG. 4) the cylinder 30 is omitted and a cylindrical drum 94 is rotatably mounted on a shaft 96 mounted between the rails 16 and 18 of the I-beam 14. The band 72 is then lapped over the rotatable drum 94. In all other respects the apparatus is the same.

The adjustable device 10 of this invention enables a bumper 92 to be mounted on it and rotated through a number of different working angles without the position of the bumper 92 on the device 10 having to be adjusted. The cylinder 30 is capable of being rotated through almost 360°, the limitation on the degree of rotation being that the bumper 92 catches on one of the sides of the I-beam 14 as the cylinder 30 is rotated. Nevertheless, the number of working angles which can be achieved is practically without limit. The cylinder 30 may be continuous or split, and may even by omitted if desired.

The foot operated brake mechanism is time and energy saving, and frees both hands for other uses. The brake mechanism holds the cylinder in any desired position.

The modified embodiment 110 of this invention comprises a rectangular base 112 upon which is welded a vertically positioned I-beam support 114 consisting of two parallel rails 116 and 118 connected by a web 120 which extends approximately ⅔ of the way up from the base 112 between the rails 116 and 188. The web 120 has a slot 122 in it at the bottom thereof. An apertured retaining plate 126 is horizontally mounted between the rails 116 and 118 at one side of the web 120 and a similar apertured retaining plate 124 is secured between the rails 116 and 118 at the other side of the web 120 and both plates protrude outwardly beyond the edges of the rails 116 and 118.

Mounted on top of the I-beam support 114 is a semi-circular plate 115 extending transversely between the rails 116 and 118. The plate 115 forms a cradle type bearing support for a work-holder support assembly 117 comprised of oppositely spaced side plates 119 and 121 which support in between them a cylindrical hub or drum 128 stationarily secured thereto. The lower ends of the side plates 119 and 121 are attached as by welding to the concave side of a co-operating upper cradle member 123 which fits into the lower stationary cradle plate 115 in rocking bearing contact therewith. Both lateral edges of the upper cradle member 123 are provided with curvilinear channel flanges 125 which project downwardly past the lateral edges of the stationary cradle plate 115 and partly underneath thereof to thereby retain the work holder assembly 117 on the lower stationary cradle plate 115 and to keep both cradle plates 115 and 123 in alignment with each other.

A rotatable split or continuous cylinder 130 is concentrically positioned around the hub 128, a split cylinder being shown.

A rectangular holding plate 132 having a notched upper surface 134 is welded to one edge of the cylinder 130 and another rectangular holding plate 136 having a notched upper surface 138 is welded to the opposite edge of the cylinder, in parallel relation to the holding plate 132.

A catch bar 140 is mounted between the holding plates 132 and 136 at one of the ends of the plates. A rotary shaft and ratchet mechanism 144 is mounted between the opposite ends of the plates.

The rotary shaft and ratchet mechanism 144 in cooperation with the catch bar 140 is adapted to adjustably operate a tightening strap 166 for the securement of a work piece such as a bumper 192 on the notched holding plates 132 and 136 as more fully shown and described in the foregoing description in connection with FIGS. 1 to 5.

A flexible metal brake band 172 having a fixed end 174 and a free end 176 is lapped over the split cylinder 130. The fixed end 174 is adjustably fastened to the retaining plate 126 on the I-beam 120 on the side opposite from the retaining plate 124 with an adjustable bolt 178 which extends through a slot 160 provided in the upper cradle member 123 and corresponding aperture in the stationary cradle member 115.

A bolt 182 is attached to the free end 176 of the brake band 172 and extends through the aperture in the retaining plate 124. A powerful spring cartridge 184 is positioned on that portion of the bolt 182 extending below the plate 124 and is biased against the underside of the plate 124 and against the end of the foot pedal 190.

The foot pedal 190 is pivoted on the support 114 and extends through the slot 122 in the web 120. One end of the foot pedal 190 is positioned underneath the spring cartridge 184 and is in contact therewith; the other end is free for application of a force thereto counteracting the force of the spring 184. The foot pedal may be extended as by means of bars (not shown) so that it can be depressed from either side of the device.

In at rest position, the expansion action of the spring 184 draws the brake band 172 tightly around the split cylinder 130 maintaining the cylinder 130 in the rotative position it then occupies on the hub 128.

When the free end of the foot pedal 190 is depressed, the spring 182 is compressed, relieving tension on the brake band 172. The split cylinder 130 is then free to be rotated to another position.

To operate the apparatus of the invention, a desired rotated position for the split cylinder 130 is selected. The foot pedal 190 is then actuated, releasing the tension on the brake band 172, and the cylinder 130 is rotated in the selected position. Then the foot pedal 190 is released, allowing the spring 182 to expand, placing the brake band 172 under tension and locking the split cylinder 130 tightly into place around the stationary hub 128.

A work piece such as a bumper 192 is placed on top of the notched plates 132 and 136 with at least one edge of the bumper disposed within aligned notches on the top surfaces 134 and 138 of the plates. A tightening strap 166 is then drawn over the bumper 192 and hooked onto the bar 140. The strap is then tightened by actuation of the ratchet mechanism 144 as more in detail described in the afore mentioned co-pending application. The tightening strap holds the bumper 192 firmly on the notched plates 132 and 136.

Figure 9:
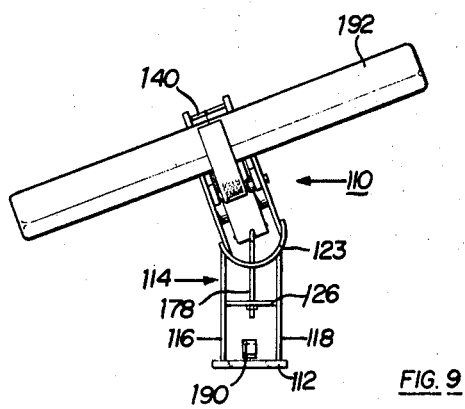
FIG. 9 is another schematic view similar to FIG. 8 of the device of FIG. 6 of the invention shown being tilted to the left.
Figure 8:
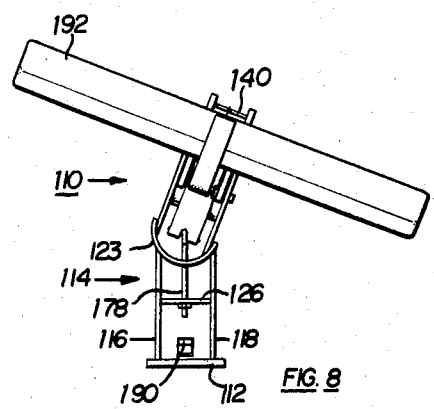
FIG. 8 is a schematic front view of the device of the invention of FIG. 6 shown being tilted to the right.
Figure 6:
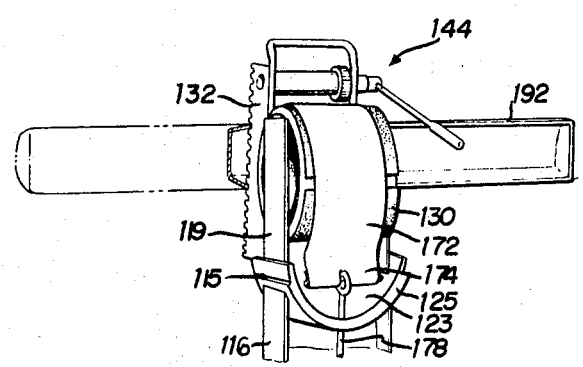
FIG. 6 is a perspective front view of a further embodiment of the device of the invention.

Referring particularily to FIGS. 8 and 9, if it is desired to tilt the work piece 192 towards one side or the other to perform a particular work operation the pedal 190 is depressed to release the brake band 172 thus removing load from the upper cradle member 123 which then can be tilted within the lower cradle member 115 towards the left as in FIG. 9 or right as in FIG. 8 as selected. Releasing of the foot pedal 190 causes the spring 184 to expand to tighten brake band 172 around the cylinder 130 thereby simultaneously placing clamping force on the cradle assembly to securely lock the cradle in the tilted position. The spring 184 is a powerful spring exerting a force of up to 2,000 lbs. to securely lock the two cradle members 115 and 123 together.

The modified embodiment 110 of the invention enables a bumper 192 to be universally mounted on it and rotated through a number of different working angles and tilted sideways without the position of the bumper 192 on the device 110 having to be adjusted. The cylinder 130 is capable of being rotated through substantially 180°, the limitation on the degree of rotation being that the bumper 192 catches on one of the sides of the I-beam 114 as the cylinder 130 is rotated and the cradle assembly is capable of angling the work piece towards the right or left through about a 30° angle from the horizontal. Thus, the number of working positions which can be achieved is practically without limit.

The foot operated brake mechanism is time and energy saving, and frees both hands for other uses. The brake mechanism securely holds the cylinder and cradle in any desired rotated and swivelled position.

Having thus described my invention, I claim:

1. An adjustable device for holding a workpiece while work is being performed on it comprising a support means having a lower and an upper vertical component, axle means horizontally mounted on said upper vertical component, a rotatable cylinder concentrically mounted on said axle means, means having elements for engagement with the edges of a bumper mounted on said rotatable cylinder, means for holding said bumper in position on said elements, means peripherally engaging said rotatable cylinder for holding said rotatable cylinder in a fixed position, means for releasing said cylinder from a fixed position, and means to pivotally support said upper component on said lower vertical component.

2. In the device as defined in claim 1, said pivotal support comprising a cradle assembly between said lower and said upper component to permit angular adjustment of said upper component relative to said lower component.

3. In the device as defined in claim 2, said means for holding and releasing said cylinder being adaptable to simultaneously lock said cradle assembly against relative rocking movement.

4. The device of claim 3 wherein said means for holding said rotatable cylinder in a fixed position is a flexible brake band lapping said cylinder and having one end attached to one side of said lower vertical component and the other end is spring biased against a retaining means on the opposite side of said lower vertical component, whereby said brake band is drawn tightly around an arc portion of said cylinder holding it in a fixed position, and locking said upper component to said lower component.

5. An adjustable device for holding an automobile bumper and the like while work is being performed on it comprising a base, an I-beam vertically mounted on said base, said I-beam comprising two parallel rails joined by a web which extends between said rails and which has an opening near said base; an outwardly extending retaining plate having an aperture therein horizontally mounted between said rails; a work support pivotally mounted on top of said I-beam for angular adjustment relative thereto; a cylindrical hub horizontally mounted on said work support between spaced side plates; a rotatable cylinder concentrically mounted around said hub; at least two holding plates having notched upper surfaces mounted in parallel on said rotatable cylinder, said holding plates having a catch bar mounted therebetween at one of their ends, and a shaft having a ratchet wheel attached thereto mounted at the other of their ends; a flexible brake band lapping the top portion of said cylinder, one end of said band being fastened to one side of said I-beam and the other end having a bolt attached thereto which extends downwardly through said aperture in said outwardly extending retaining plate horizontally mounted on said I-beam, and which is spring biased against the underneath side of said plate to tension said brake band to thereby lock said cylinder against rotation and said work support against angular displacement; a foot pedal having a first and second end extending through said opening in said web of said I-beam fulcrumed on said I-beam, said first end of said pedal being located under said bolt whereby a downward force on said second end of said pedal compresses said spring thus relieving the tension on said brake band and allowing said cylinder to be rotated to a new position and said work support to be angularily adjusted relative to said I-beam.

* * * * *